United States Patent [19]

Nakahara et al.

[11] Patent Number: 5,858,898
[45] Date of Patent: Jan. 12, 1999

[54] OPTICAL GLASS HAVING A NEGATIVE ANOMALOUS DISPERSION

[75] Inventors: Muneo Nakahara; Michiko Morishita, both of Sagamihara, Japan

[73] Assignee: Kabushiki Kaisha Ohara, Japan

[21] Appl. No.: 944,187

[22] Filed: Oct. 6, 1997

[30] Foreign Application Priority Data

Oct. 23, 1996 [JP] Japan ................................. 8-299448

[51] Int. Cl.$^6$ .............................. C03C 4/00; C03C 3/064; C03C 3/066; C03C 3/068
[52] U.S. Cl. ................................ 501/77; 501/78; 501/79; 501/903
[58] Field of Search .................. 501/77, 78, 79, 501/903

[56] References Cited

U.S. PATENT DOCUMENTS

| | | | |
|---|---|---|---|
| 3,460,954 | 8/1969 | Young et al. | 501/903 |
| 4,055,435 | 10/1977 | Sagara | 501/79 |
| 4,084,978 | 4/1978 | Sagara | 501/77 |
| 4,390,638 | 6/1983 | Mennemann et al. | 501/77 |
| 5,104,831 | 4/1992 | Behr et al. | 501/903 |

FOREIGN PATENT DOCUMENTS

| | | | |
|---|---|---|---|
| 53-90312 | 8/1978 | Japan | 501/78 |
| 60-221338 | 11/1985 | Japan | 501/903 |
| 2099417 | 12/1981 | United Kingdom | 501/903 |

Primary Examiner—Melissa Bonner
Attorney, Agent, or Firm—Hedman, Gibson & Costigan, P.C.

[57] ABSTRACT

An optical glass having optical constants of refractive index within the range of 1.55–1.75 and Abbe number ($\nu$ d) within the range of 25–51 and having large negative anomalous dispersion which is substantially free of lead and arsenic compounds includes as its essential ingredients in weigth percent 10–>40% $SiO_2$, 12.5–35% $B_2O_3$, 3–20% $ZrO_2$ and 6–30% $Nb_2O_5$.

2 Claims, 2 Drawing Sheets

OPTICAL GLASS HAVING A NEGATIVE ANOMALOUS DISPERSION

BACKGROUND OF THE INVENTION

This invention relates to an optical glass having optical constants of refractive index (nd) within the range of 1.55–1.75 and Abbe number (v d) within the range of 25–51, also having a large negative anomalous dispersion (Δ θ g.F) and being substantially free of a lead compound and an arsenic compound.

As an optical glass having such optical constants and having a negative anomalous dispersion property, there is known a glass of a $B_2O_3$—$Al_2O_3$—PbO system. This system of glass, however, requires a relatively large amount of PbO with the result that the glass tends to have a relatively high density and is insufficient in chemical durability and, for these reasons, the glass has only a limited application. As glass systems containing no PbO, there are known glasses disclosed in Japanese Patent Publication No. 50-18007, Japanese Patent Publication No. 58-49502 and German Patent Publication No. 4,032,566. These glasses require a large amount of polyvalent metal oxide or oxides such as $Ta_2O_5$ or a large amount of $ZrO_2$, $Nb_2O_5$ and $Ta_2O_5$ for imparting a negative anomalous dispersion property to the glasses and this poses the problem that it is difficult to melt a batch of raw materials completely to obtain a homogenious glass.

Development of an optical glass having large negative anomalous dispersion is quite useful for designing of various optical glasses. In a normal optical glass which does not have large anomalous dispersion, chromatic aberration can be removed for a two-color light by combining two types of optical lenses having different Abbe numbers. As regards light of other colors, however, there still exists a residual chromatic aberration which is expressed as secondary spectra. For correcting such secondary spectra, particularly light of the ultraviolet spectrum, two different optical lenses having extremely deviated positive and negative anomalous dispersion characteristics are combined together. By this arrangement, a substantial amount of the secondary spectra can be removed.

It is an object of the present invention to provide an optical glass having large negative anomalous dispersion which is equal to or greater than the prior art optical glasses and having an excellent homogeniety without containing compounds such as PbO and $As_2O_3$ which are undesirable for the environment and without requiring the $Ta_2O_5$ ingredient which is very costly.

SUMMARY OF THE INVENTION

Laborious studies and experiments made by the inventors of the present invention for achieving the above described object of the invention have resulted in the finding, which has led to the present invention, that an optical glass having large negative anomalous dispersion and having a high homogeniety can be provided in a $SiO_2$— $B_2O_3$—$ZrO_2$—$Nb_2O_5$ system glass of a specific composition which is substantially free of PbO and $As_2O_3$.

An optical glass achieving the above described object of the invention consists in weight percent of:

| | |
|---|---|
| $SiO_2$ | 10–>40% |
| $B_2O_3$ | 12.5–35% |
| $ZrO_2$ | 3–20% |
| $Nb_2O_5$ | 6–30% |
| $Li_2O$ | 0–5% |
| $Na_2O$ | 0–25% |
| $K_2O$ | 0–10% |
| MgO + CaO | >5% |
| in which MgO | 0–>5% |
| CaO | 0–>5% |
| SrO | 0–15% |
| BaO | 0–20% |
| ZnO | 0–15% |
| $Al_2O_3$ | 0–3% |
| $La_2O_3$ | 0–10% |
| $Ta_2O_5$ | 0–15% |
| $P_2O_5$ | 0–>5% |
| $GeO_2$ | 0–5% |
| $SnO_2$ | 0–2% |
| $WO_3$ | 0–5% |
| $Sb_2O_3$ | 0–1% |
| and a fluoride or fluorides of a metal element or elements contained in the above metal oxides, a total amount of F contained in the fluoride or fluorides. | 0–5% |

In one aspect of the invention, the optical glass consists in weight percent of:

| | |
|---|---|
| $SiO_2$ | 17–>40% |
| $B_2O_3$ | 12.5–33% |
| $ZrO_2$ | 7–18% |
| $Nb_2O_5$ | 6–29% |
| $Li_2O$ | 0–2.5% |
| $Na_2O$ | 4–25% |
| $K_2O$ | 0–5% |
| MgO + CaO in which | >5% |
| MgO | 0–>5% |
| CaO | 0–>5% |
| SrO | 0–5% |
| BaO | 0–19% |
| ZnO | 0–6% |
| $Al_2O_3$ | 0–3% |
| $La_2O_3$ | 0–5% |
| $Ta_2O_5$ | 0–10% |
| $P_2O_5$ | 0–>5% |
| $GeO_2$ | 0–5% |
| $SnO_2$ | 0–2% |
| $WO_3$ | 0–5% |
| $Sb_2O_3$ | 0–1% |
| and a fluoride or fluorides of a metal element or elements contained in the above metal oxides, a total amount of F contained in the fluoride or fluorides | 0–3%, | and having optical constants of refractive index (nd) within the range of 1.55–1.75 and Abbe number (v d) within the range of 25–51.

DETAILED DESCRIPTION OF THE INVENTION

In the glass made according to the invention, the above described content ranges of the respective ingredients have been selected for the reasons stated below. In the following description, the content range of the respective ingredients are expressed in weight percent.

The $SiO_2$ ingredient is an indispensable ingredient as a glass forming oxide. If the amount of this ingredient is below 10%, a stable glass cannot be obtained whereas if the amount of this ingredient is 40% or over, the refractive index of the glass obtained fails to fall within the desired range.

The preferable range of this ingredient for obtaining a glass of a good melting property and excellent homogeniety is 17->40%.

The $B_2O_3$ ingredient is also as important a glass forming oxide as $SiO_2$. If the amount of this ingredient is below 12.5%, viscosity is too high, the melting property is poor and the anomalous dispersion property decreases. If the amount of this ingredient exceeds 35%, the glass becomes instable and crystals tend to grow. A preferable range of this ingredient for a good chemical durability and homogeniety is 12.5–33%.

The $ZrO_2$ ingredient is effective for increasing the refractive index and the anomalous dispersion property of the glass. If the amount of this ingredient is below 3%, such effect cannot be sufficiently obtained whereas if the amount of this ingredient exceeds 20%, an unmelted portion in the glass tends to increase. A preferable range of this ingredient for good melting property and homogeniety is 7–18%.

The $Nb_2O_5$ ingredient is effective for adjusting the refractive index and Abbe number. If the amount of this ingredient is below 6%, such effect cannot be obtained whereas if the amount of this ingredient exceeds 30%, devitrification tendency increases and the anomalous dispersion property decreases. A preferable range of this ingredient is 6–29%.

The $Li_2O$ ingredient which enhances melting of the glass can be added up to 5%. Since, however, this ingredient increases devitrifaction, the amount of this ingredient should preferably be up to 2.5%. $Na_2O$ and $K_2O$ which respectively enhance melting of the glass can be added up to 25% and 10%. Since these ingredients tend to deteriorate chemical durability, a preferable range is 4–25% for $Na_2O$ and up to 5% for $K_2O$.

The MgO and CaO ingredients are effective for improving chemical durability and adjusting the refractive index and Abbe number but increase the devitrification tendency. The amounts of these ingredients should therefore be less than 5% respectively. The total amount of these ingredients should also be less than 5%. The SrO ingredient is an ingredient which is effective for adjusting the refractive index and Abbe number and can be added up to 15%. Since, however, this ingredient tends to increase the devitrification tendency and deteriorate chemical durability, a preferable range is up to 5%.

The BaO ingredient is effective for enlarging the glassifying range and can be added up to 20%. This ingredient, however, tends to decrease the anomalous dispersion property of the glass, so that a preferable range is up to 19%. The ZnO ingredient is effective also for enlarging the glassifying range and can be added up to 15%. Since, however, this ingredient tends to prevent sufficient increase of the anomalous dispersion property, a preferable range is up to 6%.

The $Al_2O_3$ ingredient is effective for improving chemical durability. Since, however, this ingredient tends to increase devitrification, the amount of this ingredient should be up to 3%. The $La_2O_3$ ingredient is effective for increasing the refractive index and improving chemical durability and can be added up to 10%. Since, however, this ingredient tends to increase devitrification, a preferable range is up to 5%.

The $Ta_2O_5$ ingredient is effective for increasing the refractive index and also increasing the anomalous dispersion property and can be added up to 15%. Since, however, the addition of this ingredient tends to produce an unmelted portion in the glass with resulting difficulty in providing a homogeneous glass, a preferable range should be up to 10%. The $P_2O_5$ ingredient is effective for adjusting the refractive index and Abbe number but increases devitrification and decreases anomalous dispersion so that the amount of this ingredient should be less than 5%.

The $GeO_2$ ingredient is a glassifying oxide and can be added for adjusting the refractive index and Abbe number. Since, however, this ingredient tends to increase devitrification, the amount of this ingredient should be up to 5%. The $SnO_2$ ingredient improves chemcical durability but decreases anomalous dispersion so that the amount of this ingredient should be up to 2%.

The $WO_3$ ingredient is effective for adjusting the refractive index and Abbe number and can be added up to 5%. Addition of this ingredient exceeding 5% is not desirable because it will increase devitrifivation. The F ingredient can be added up to 5% in the form of a compound replacing a part or whole of the above described oxides. Since, however, this ingredient tends to produce cord in the glass and increase devitrification, a preferable range should be up to 3%. The $Sb_2O_3$ ingredient may be added as a defoaming agent for refining and homogenizing the glass. The amount up to 1% will suffice.

Examples of the optical glass according to the invention will be described below with reference to the accompanying drawings.

BRIEF DESCRIPTION OF THE DRAWINGS

In the accompanying drawings.

EXAMPLES

Figure 1:
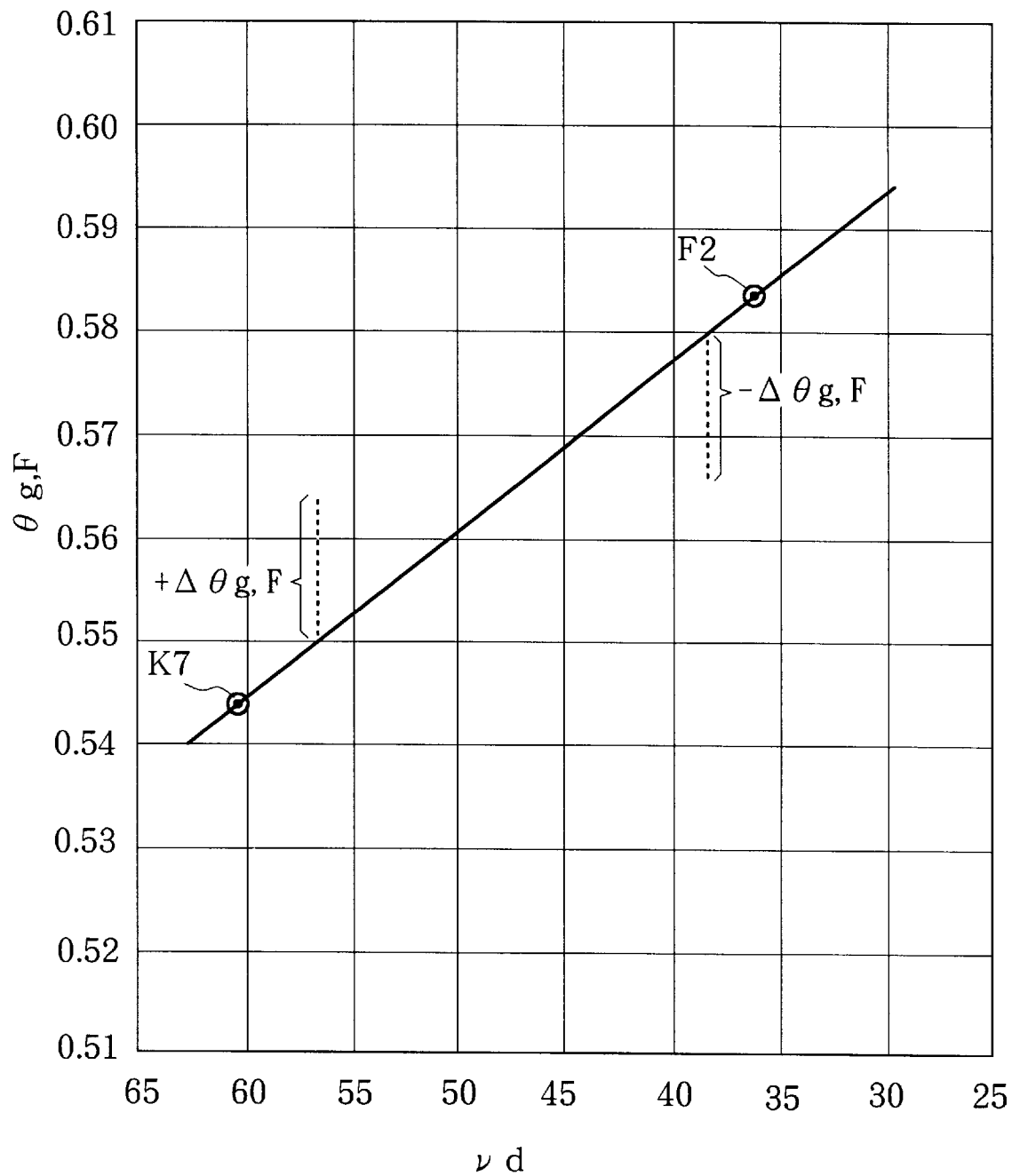
FIG. 1 is a θ g.F—ν d diagram showing positive and negative anomalous dispersion (Δ θ g.F)

Tables 1 to 5 show Examples No. 1 to No. 25 of the present invention having the refractive index (nd) within the range of 1.55–1.75 and Abbe number (ν d) within the range of 25–51 and having large negative anomalous dispersion. These tables show the compositions, refractive index (nd) Abbe number (ν d), partial dispersion ratio (θ g.F) and anomalous dispersion (Δ θ g.F) of these Examples.

TABLE 1

|  | Examples | | | | | weight % |
|---|---|---|---|---|---|---|
|  | 1 | 2 | 3 | 4 | 5 |
| $SiO_2$ | 33.00 | 22.30 | 22.90 | 22.20 | 25.90 |
| $B_2O_3$ | 14.00 | 12.90 | 23.00 | 13.00 | 28.00 |
| $ZrO_2$ | 13.00 | 12.40 | 13.00 | 12.40 | 13.00 |
| $Nb_2O_5$ | 26.90 | 25.60 | 10.00 | 25.60 | 10.00 |
| $Li_2O$ | | | | | |
| $Na_2O$ | 13.00 | 21.90 | 7.00 | 21.90 | 4.00 |
| $K_2O$ | | | | | |
| MgO | | 4.80 | | | |
| CaO | | | 4.80 | | 4.50 |
| SrO | | | | 4.80 | |
| BaO | | | 19.00 | | 14.50 |
| ZnO | | | | | |
| $Al_2O_3$ | | | | | |
| $La_2O_3$ | | | | | |
| $Sb_2O_3$ | 0.10 | 0.10 | 0.30 | 0.10 | 0.10 |
| $GeO_2$ | | | | | |
| $SnO_2$ | | | | | |
| $Ta_2O_5$ | | | | | |
| $P_2O_5$ | | | | | |
| $WO_3$ | | | | | |
| $KHF_2$ | | | | | |

TABLE 1-continued

| | Examples | | | | weight % |
|---|---|---|---|---|---|
| | 1 | 2 | 3 | 4 | 5 |
| nd | 1.67280 | 1.67633 | 1.64601 | 1.68451 | 1.63565 |
| νd | 35.0 | 35.8 | 44.2 | 35.7 | 46.0 |
| θg, F | 0.5788 | 0.5783 | 0.5585 | 0.5781 | 0.5499 |
| Δθg, F | −0.0059 | −0.0051 | −0.0113 | −0.0054 | −0.0169 |

TABLE 2

| | Examples | | | | weight % |
|---|---|---|---|---|---|
| | 6 | 7 | 8 | 9 | 10 |
| $SiO_2$ | 24.90 | 20.00 | 20.20 | 22.80 | 20.00 |
| $B_2O_3$ | 18.00 | 15.20 | 15.00 | 13.50 | 15.20 |
| $ZrO_2$ | 13.00 | 12.40 | 12.40 | 12.70 | 12.40 |
| $Nb_2O_5$ | 10.00 | 25.60 | 25.60 | 26.40 | 25.60 |
| $Li_2O$ | | | | | |
| $Na_2O$ | 7.00 | 21.90 | 21.90 | 22.50 | 21.90 |
| $K_2O$ | | | | | |
| MgO | | | | | |
| CaO | 4.50 | | | | |
| SrO | 3.00 | | | | |
| BaO | 16.50 | | | | |
| ZnO | | 4.80 | | | |
| $Al_2O_3$ | 3.00 | | | | |
| $La_2O_3$ | | | 4.80 | | |
| $Sb_2O_3$ | 0.10 | 0.10 | 0.10 | 0.10 | 0.10 |
| $GeO_2$ | | | | | |
| $SnO_2$ | | | | 2.00 | |
| $Ta_2O_5$ | | | | | |
| $P_2O_5$ | | | | | 4.80 |
| $WO_3$ | | | | | |
| $KHF_2$ | | | | | |
| nd | 1.60691 | 1.68538 | 1.69056 | 1.68441 | 1.66881 |
| νd | 50.7 | 34.8 | 35.2 | 35.0 | 35.9 |
| θg, F | 0.5460 | 0.5748 | 0.5770 | 0.5811 | 0.5779 |
| Δθg, F | −0.0132 | −0.0102 | −0.0067 | −0.0036 | −0.0053 |

TABLE 3

| | Examples | | | | weight % |
|---|---|---|---|---|---|
| | 11 | 12 | 13 | 14 | 5 |
| $SiO_2$ | 20.00 | 25.00 | 20.00 | 25.90 | 38.49 |
| $B_2O_3$ | 15.20 | 17.00 | 15.20 | 28.00 | 16.79 |
| $ZrO_2$ | 12.40 | 18.00 | 12.40 | 12.00 | 9.01 |
| $Nb_2O_5$ | 25.60 | 10.00 | 25.60 | 6.00 | 13.92 |
| $Li_2O$ | | | | | |
| $Na_2O$ | 21.90 | 23.00 | 21.90 | 4.00 | 7.78 |
| $K_2O$ | | | | | 4.09 |
| MgO | | | | | |
| CaO | | | | 4.50 | 1.43 |
| SrO | | | | | |
| BaO | | | | 17.50 | 5.12 |
| ZnO | | | | | 3.28 |
| $Al_2O_3$ | | | | | |
| $La_2O_3$ | | | | | |
| $Sb_2O_3$ | 0.10 | 0.10 | | | |
| $GeO_2$ | 4.80 | | | | |
| $SnO_2$ | | | | | |
| $Ta_2O_5$ | | 4.90 | | | |
| $P_2O_5$ | | | | | |
| $WO_3$ | | 2.00 | | | |
| $KHF_2$ | | | 4.80 | | |
| nd | 1.68171 | 1.63693 | 1.66644 | 1.63377 | 1.61366 |
| νd | 35.2 | 41.2 | 35.9 | 50.5 | 44.0 |
| θg, F | 0.5778 | 0.5617 | 0.5768 | 0.5478 | 0.5581 |
| Δθg, F | −0.0066 | −0.0129 | −0.0064 | −0.0117 | −0.0120 |

TABLE 4

| | Examples | | | | weight % |
|---|---|---|---|---|---|
| | 16 | 17 | 18 | 19 | 20 |
| $SiO_2$ | 25.00 | 26.32 | 39.50 | 22.92 | 17.50 |
| $B_2O_3$ | 17.00 | 12.63 | 14.20 | 23.02 | 15.00 |
| $ZrO_2$ | 18.00 | 13.69 | 7.70 | 13.01 | 13.00 |
| $Nb_2O_5$ | 14.90 | 23.05 | 11.50 | 10.01 | 23.40 |
| $Li_2O$ | | | | | |
| $Na_2O$ | 23.00 | 24.21 | 7.70 | 7.01 | 10.00 |
| $K_2O$ | | | 5.00 | | 1.00 |
| MgO | | | | | |
| CaO | | | 3.00 | 14.00 | 1.00 |
| SrO | | | | | |
| BaO | | | 6.30 | 14.00 | 19.00 |
| ZnO | | | 5.00 | 6.00 | |
| $Al_2O_3$ | | | | | |
| $La_2O_3$ | | | | | |
| $Sb_2O_3$ | 0.10 | 0.10 | 0.10 | 0.01 | 0.10 |
| $GeO_2$ | | | | | |
| $SnO_2$ | | | | | |
| $Ta_2O_5$ | | | | | |
| $P_2O_5$ | | | | | |
| $WO_3$ | 2.00 | | | | |
| $KHF_2$ | | | | | |
| nd | 1.64432 | 1.66366 | 1.61161 | 1.66336 | 1.73030 |
| νd | 39.8 | 36.8 | 46.2 | 45.7 | 35.2 |
| θg, F | 0.5676 | 0.5668 | 0.5536 | 0.5563 | 0.5811 |
| Δθg, F | −0.0807 | −0.0150 | −0.0129 | −0.0110 | −0.0033 |

TABLE 5

| | Examples | | | | weight % |
|---|---|---|---|---|---|
| | 21 | 22 | 23 | 24 | 25 |
| $SiO_2$ | 22.90 | 26.20 | 39.90 | 17.50 | 39.26 |
| $B_2O_3$ | 33.00 | 12.58 | 15.70 | 20.00 | 16.36 |
| $ZrO_2$ | 13.00 | 14.36 | 10.70 | 13.00 | 8.69 |
| $Nb_2O_5$ | 10.00 | 28.19 | 11.50 | 23.40 | 14.01 |
| $Li_2O$ | | 2.10 | | | |
| $Na_2O$ | 7.00 | 12.91 | 7.70 | 5.00 | 7.77 |
| $K_2O$ | | | 5.00 | 1.00 | 3.48 |
| MgO | | | | | |
| CaO | 10.00 | | | 1.00 | 1.33 |
| SrO | | | | | |
| BaO | 4.00 | 3.56 | | 14.00 | 4.81 |
| ZnO | | | | | 3.37 |
| $Al_2O_3$ | | | | | |
| $La_2O_3$ | | | | | |
| $Sb_2O_3$ | 0.1 | 0.1 | 0.2 | 0.1 | 0.10 |
| $GeO_2$ | | | | | |
| $SnO_2$ | | | | | |
| $Ta_2O_5$ | | | 9.30 | | |
| $P_2O_5$ | | | | | |
| $WO_3$ | | | | 5.00 | |
| $KHF_2$ | | | | | 0.82 |
| nd | 1.63096 | 1.71443 | 1.60745 | 1.72507 | 1.61191 |
| νd | 46.9 | 34.0 | 42.2 | 34.0 | 44.3 |
| θg, F | 0.5546 | 0.5831 | 0.5650 | 0.5859 | 0.5612 |
| Δθg, F | −0.0108 | −0.0032 | −0.0080 | −0.0004 | −0.0084 |

The partial dispersion ratio (θ g.F) herein means ratio of $(n_g-n_F)$ to the main dispersion $(n_F-n_c)$. In FIG. 1, normal glasses F2 and K7 are selected as reference, the vertical axis represents the partial dispersion ratio (θ g.F) and the horizontal axis represents the Abbe number (ν d) and difference in the vertical axis between the line connecting the two glasses F2 and K7 and each of the Examples is expressed as deviation in the partial dispersion ratio, i.e., the anomalous dispersion (Δ θ g.F). In the case where the value of the partial dispersion ratio is located above the line connecting the two reference glasses, the value represents positive anomalous dispersion (+Δ θ g.F) and, in the case where the value of the partial dispersion ratio is located below this line, the value represents negative anomalous dispersion (−Δ θ g.F).

Figure 2:
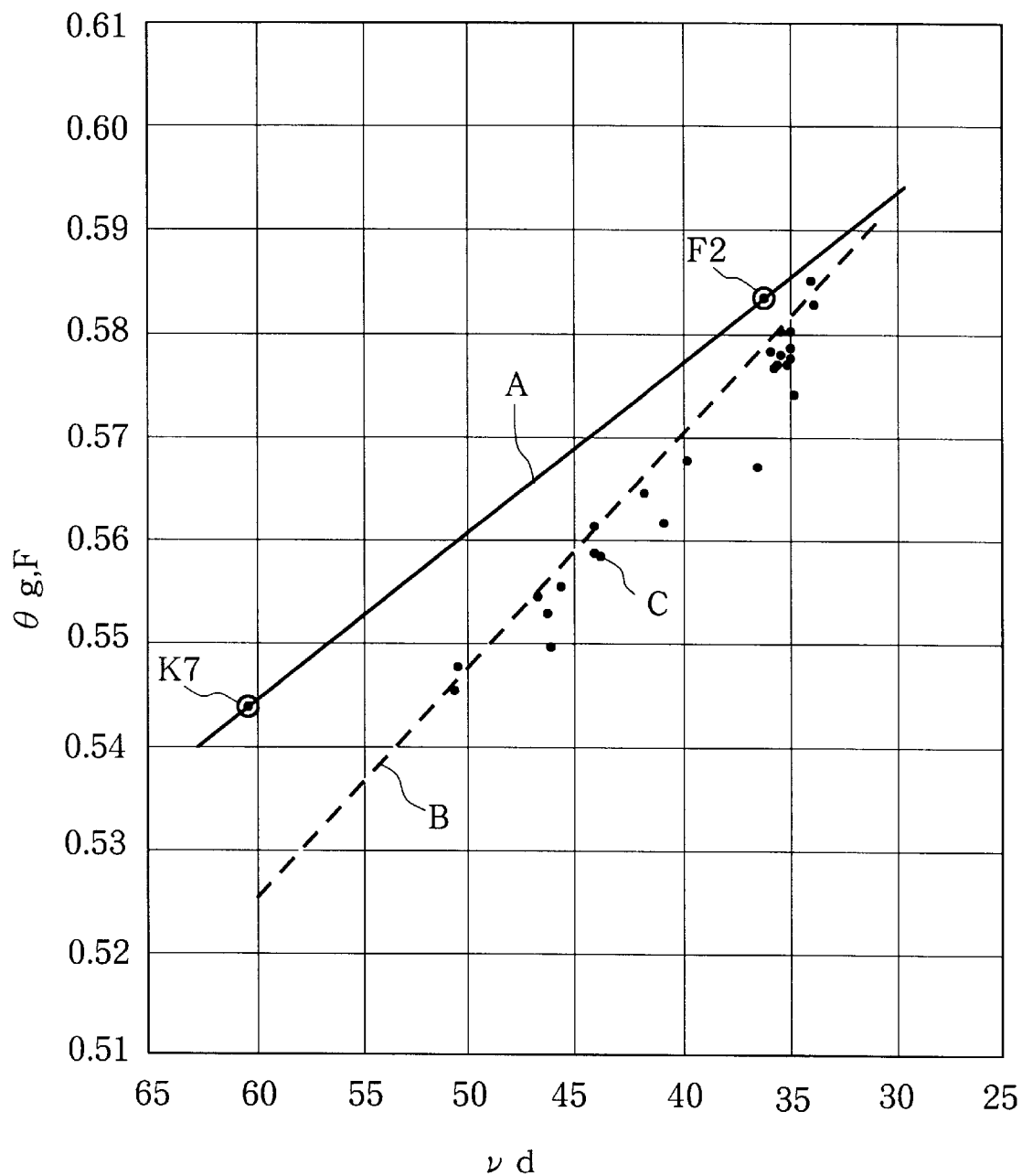
FIG. 2 is a diagram showing a partial dispersion ratio (θ g.F) of the Examples (No. 1 to No. 25) of the present invention.

In FIG. 2, the line connecting the normal glasses F2 and K7 is shown by a solid line, the line representing the prior art negative anomalous dispersion glass is shown by a dotted line and the values of the partial dispersion ratio of the Examples No. 1 to No. 25 of the present invention are shown by black dots C.

As shown in Tables 1–5 and FIG. 2, the glass made according to the invention have equal or larger negative anomalous dispersion values (−Δ θ g.F) as compared with the prior art glasses while having desired optical constants.

For manufacturing the glasses of Examples No. 1 to No. 25, raw materials of the optical glass including oxides, carbonates and nitrates are weighed and mixed and the mixture is melted in a platinum crucible at a temperature within a range from 1300° C. to 1400° C. for about 3 to 4 hours depending upon the melting property of the raw materials. The melted glass is stirred and homogenized and then the temperature is lowered to a proper temperature. The glass is formed to a glass product by casting in a metal mold and subsequent anneling.

As described in the foregoing, according to the invention, the optical glass of the present invention is a $SiO_2$—$B_2O_3$—$ZrO_2$—$Nb_2O_5$ system glass of a specific composition range, has optical constants of refractive index (nd) within the range of 1.55–1.75 and Abbe number (ν d) within the range of 25–51 and has large negative anomalous dispersion and excellent homogeniety.

What is claimed is:

1. An optical glass consisting in weight percent of:

| | |
|---|---|
| $SiO_2$ | 10–>40% |
| $B_2O_3$ | 12.5–35% |
| $ZrO_2$ | 3–20% |
| $Nb_2O_5$ | 6–30% |
| $Li_2O$ | 0–5% |
| $Na_2O$ | 0–25% |
| $K_2O$ | 0–10% |
| MgO + CaO | >5% |
| in which MgO | 0–>5% |
| CaO | 0–>5% |
| SrO | 0–15% |
| BaO | 0–20% |
| ZnO | 0–15% |
| $Al_2O_3$ | 0–3% |
| $La_2O_3$ | 0–10% |
| $Ta_2O_5$ | 0–15% |
| $P_2O_5$ | 0–>5% |
| $GeO_2$ | 0–5% |
| $SnO_2$ | 0–2% |
| $WO_3$ | 0–5% |
| $Sb_2O_3$ | 0–1% |
| and a fluoride or fluorides of a metal element or elements contained in the above metal oxides, a total amount of F contained in the fluoride or fluorides. | 0–5% |

2. An optical glass as defined in claim 1 consisting in weight percent of:

| | |
|---|---|
| $SiO_2$ | 17–>40% |
| $B_2O_3$ | 12.5–33% |
| $ZrO_2$ | 7–18% |
| $Nb_2O_5$ | 6–29% |
| $Li_2O$ | 0–2.5% |
| $Na_2O$ | 4–25% |
| $K_2O$ | 0–5% |
| MgO + CaO | >5% |
| in which | |
| MgO | 0–>5% |
| CaO | 0–>5% |
| SrO | 0–5% |
| BaO | 0–19% |
| ZnO | 0–6% |
| $Al_2O_3$ | 0–3% |
| $La_2O_3$ | 0–5% |
| $Ta_2O_5$ | 0–10% |
| $P_2O_5$ | 0–>5% |
| $GeO_2$ | 0–5% |
| $SnO_2$ | 0–2% |
| $WO_3$ | 0–5% |
| $Sb_2O_3$ | 0–1% |
| and a fluoride or fluorides of a metal element or elements contained in the above metal oxides, a total amount of F contained in the fluoride or fluorides | 0–3%, | and having optical constants of refractive index (nd) within the range of 1.55–1.75 and Abbe number (ν d) within the range of 25–51.

* * * * *